Figure 1:
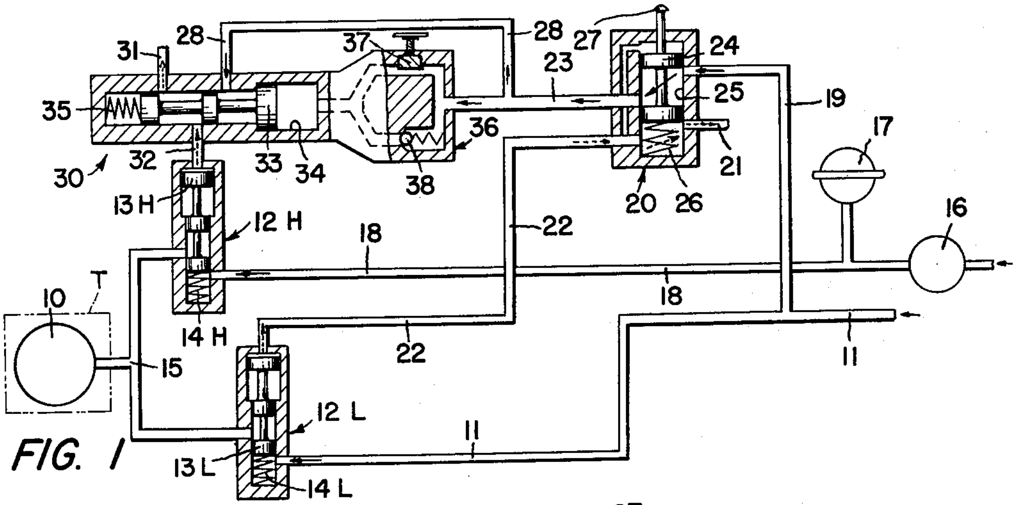

April 9, 1963 J. W. WATSON 3,084,674

PNEUMATIC SYSTEM FOR MULTIPLE NUT RUNNER

Filed July 20, 1961

INVENTOR
JOHN W. WATSON
BY Charles J. Worth
HIS AGENT 3,084,674

PNEUMATIC SYSTEM FOR MULTIPLE NUT RUNNER

John W. Watson, Milan, Pa., assignor to Ingersoll-Rand Company, New York, N.Y., a corporation of New Jersey Filed July 20, 1961, Ser. No. 125,498
8 Claims. (Cl. 121—33)

This invention relates to control systems for power devices and more particularly to semi-automatic systems for such devices to provide high and low force outputs during each operating cycle.

One such device particularly adapted to the novel control system is a nut runner, either, of the type, for driving and torquing a single nut or, simultaneously, a plurality of nuts.

There are many and varied installations that require a plurality of equally torqued nuts. Probably, one of the most common and well known is the connection of a head to an engine block. At one time, each nut was run-down, then individually torqued in a predetermined sequence by a torque wrench. Of course, this was a slow and tedious task. However, with power operated multiple nut runners, a plurality of nuts now can be simultaneously run-down and be equally torqued. Similar tools for singularly torquing nuts are also available.

Considering now pressure fluid torquing devices, relatively high pressure fluid is required to develop output forces normally required for final torquing. To use such high pressure fluid for both run-down and torquing, not only requires large and heavy duty equipment to provide the required high power input for the tool, but may also cause unequal torquing as a result of the relative high mass velocities of the various motors. To control force output, or to provide low force for run-down by blow-by or by choking a high power input again requires large heavy duty equipment. Mechanical high/low torque clutches are not only inaccurate, but also waste power.

Accordingly, the novel control system contemplates the use of high and low power inputs. At this point it might be well to understand that the terms "high" and "low" are not used herein to identify the actual values of the power inputs or the force outputs, but rather, to identify the relative values of the inputs or the outputs to each other. The low power input is used for the run-down or major portion of the operating cycle. The high power input is then used only for final torquing. Thus, it can be readily seen that with the novel control system, the motors never run for an extended period of time at high speeds to final torquing which therefore prevents torque inaccuracies caused by mass velocities of the motors.

The novel system also incorporates an automatic sequencing or time delay means for stopping high power motor operation after a predetermined interval for conservation purposes. In this way, the control system permits the use of small and economical equipment for providing the required high power input as an adjunct to normal low power.

Most modern installations which use pressure fluid to operate tools, have a single plantwise installation for providing such fluid at a predetermined pressure. Inasmuch as the present invention is not directly concerned with the pressure sources per se, the description that follows is based on the premise of a normal plantwise low power source and an auxiliary high power source. However, this is merely illustrative of any of the well known means for providing two pressure fluids, each at a different pressure gradiant than the other.

An object of this invention is to provide an efficient control system with economical power input requirements for power tools having low and high force output intervals during each operating sequence.

Another object of this invention is to provide the kind of control system as described above that provides primarily a low force output for the majority of the tool operating sequence, and a high force output of short duration to terminate the operating sequence.

Another object of this invention is to provide an efficient control system for low/high force output power tools operating on low/high power inputs that automatically stops or limits the high power input/high force output operation.

Another object of this invention is to provide the kind of control system as described above wherein the high pressure fluid may be replenished during low force output operation.

This invention contemplates a control system for power tools having at least one fluid motor, comprising normally closed pilot operated flow control valve means to connect sources of high and low pressure fluid to each motor, a control valve connected to the low pressure fluid source to pilot operate the flow control valve means for deriving low force motor output from the low pressure fluid and high force motor output from the high pressure fluid input, and delay means connecting the control valve to the pilot operated valve means and being responsive to the low pressure fluid from the control valve for limiting high force motor output.

The foregoing and other objects and advantages of the invention will appear more fully hereinafter from a consideration of the detailed description which follows, taken together with the accompanying drawing, wherein a single embodiment of the invention is illustrated by way of example. It is to be expressly understood, however, that the drawing is for illustration purposes only and is not to be construed as defining the limits of the invention.

Figure 2:
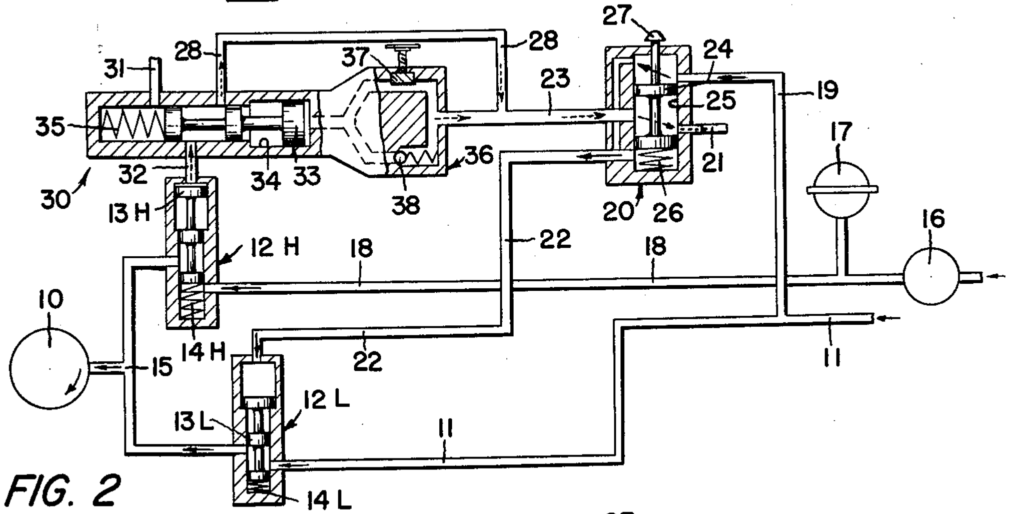
Figure 3:
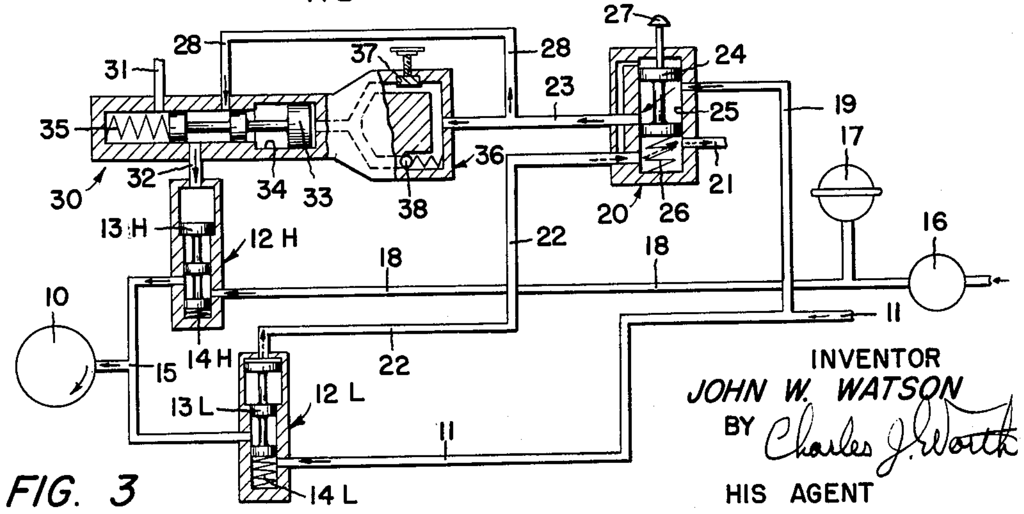

FIGURE 1 is a schematic view of a novel control system for fluid motors, constructed according to the invention, with the motors at rest, and FIGURES 2 and 3 are schematic views similar to FIGURE 1 in which the system provides pressure fluid to each motor to derive low and high force outputs, respectively.

Referring now to the drawings, a tool T has a motor or motors 10 that operate on low and high pressure fluids. A line 11 provides the low pressure fluid from a source (not shown) and is connected to the input of a normally closed pilot operated flow control valve 12L. The valve 12L has an output connected to the feed or input line 15 of each motor 10, and a plunger 13L that is normally biased to a blocking position by a spring 14L.

A small high power compressor 18, associated with an accumulator 17, is connected to the input of a second pilot operated flow control valve 12H and provides high pressure fluid.

The output of the valve 12H is also connected to the input of each motor 10 by the line 15. Valve 12H is similar to valve 12L and has a plunger 13H normally biased to a blocking position by a spring 14H.

A manual control valve 20 is connected to a branch line 19 of the low pressure fluid line 11 and has a vent 21. The valve 20 has two motor ports, one of which is connected to the pilot input of the low pressure fluid flow control valve 12L by a line 22. The other motor port of valve 20 is connected to the input of a time delay device 36 by a line 23 that has a branch line 28 connected to a time delay, pilot actuated flow control valve 30.

The manual control valve 20 has two operating positions determined by a plunger 24 movable in a bore 25 and biased to a first operating position by a spring 26 to connect low pressure fluid from the branch line 19 to the line 23, and simultaneously to connect line 22 to the vent 21. By depressing a knob 27 on the plunger 24, the valve 20 reverses the flow connections and then connects line 22 to the low pressure fluid from line 19, and simultaneously connects line 23 to vent 21, as shown in FIGURE 2.

The time delay actuated valve 30 is constructed similar to the flow control valves 12L and 12H but has a vent 31 and is controlled by the delay device 36.

The input of valve 30 is connected to the branch line 28 and its output is connected to the pilot input of the high pressure fluid flow control valve 12H by a line 32. The valve 30 has a plunger 33 movable in a bore 34 that is biased by a spring 35 to connect line 28 to line 32 and is shifted against the spring by low pressure fluid from the time delay device 36 to connect line 32 to vent 31.

The time delay device 36 is comprised of a bifurcated passage connected to line 23, one of the passages having a ball check 38 to block fluid flow from line 23 to the valve 30 and the other line having an adjustable restriction 37 for limiting the amount of pressure fluid which may flow from line 23 to the valve 30.

In operation, when the motor 10 and the system have completed an operating cycle as shown in FIGURE 1, plunger 24 of control valve 20 is maintained by spring 26 and low pressure fluid from line 23 has passed through the time delay device 36 to hold plunger 33 of valve 30 against spring 35 to connect the pilot motor of valve 12H to vent 31. Thus, spring 14H has returned the plunger 13H to its closed position which blocks high pressure fluid in line 18. Simultaneously the pilot motor of valve 12L is vented via line 22, valve 20 and vent 21. Therefore, each motor 10 is at rest.

To start motor operation, the knob 27 is depressed, shifting the plunger 24 against the spring 26 as shown in FIGURE 2. This connects line 23 with vent 21, venting the time delay device 36 and thus, the plunger 33 of valve 30 is returned by the spring 35 and connects the motor portion of the valve 12H to line 28 and to vent 21. Simultaneously, pressure fluid from line 19 is connected to line 22 to pilot operate the valve 12L by shifting plunger 13L against spring 14L to its open position for passing low pressure operating fluid via line 15 for driving each motor 10 at low speed (low force output). In a nut runner, each motor 10 would then be run to a stall.

When each motor 10 is stalled, valve 20 is returned to its normal position by releasing the knob 27 to permit the spring 26 to urge the plunger 24 back against the upper end of the valve as shown in FIGURE 3. This connects line 22 to vent 21 to close valve 12L when spring 14L biases plunger 13L to its original position blocking line 11 and low pressure fluid from each motor 10. However, line 23 is now connected to line 19 as is its branch line 28. Low pressure fluid from branch line 28 passes through valve 30 into line 32 to pilot operate the valve 12L by driving plunger 13H against the spring 14H to open the path for high pressure fluid from the compressor 16 and accumulator 17 via lines 18 and 15 for driving each motor 10 at high speed (high force output). When the system is used with a nut runner, each motor 10 provides a high force output for torquing the nut. However, inasmuch as the nut previously has been run-down to a stall, each motor 10 now merely torques the nut, as required.

The time delay device 16 is adjusted by varying the restriction 37 so that pressure fluid from line 23 slowly builds up behind plunger 33 of valve 30. This is arranged to provide sufficient pressure to drive plunger 33 against spring 35 only after motor 10 has stalled. At this time, the motor of valve 12H is reconnected to vent 31 by accumulated pressure fluid passing through the delay device 36 to drive plunger 33 against spring 35. The novel control system is again as shown in FIGURE 1. However, when line 23 is connected to vent 21 by valve 20, pressure fluid rapidly exhausts from the pilot motor portion of valve 30 not only past the restriction 37 but also across check valve 38.

Accordingly, it should be readily understood that the novel system provides semi-automatic control for providing a sequenced operation for a tool wherein each motor provides low force output for the major portion of its operating cycle in response to a low power input, high force output for a short time interval in response to a low power input, and time delay means responsive to low fluid pressure automatically limits the delivery of the high pressure input to each motor to a predetermined time interval.

While a preferred embodiment of the invention has been shown, modifications thereto will readily occur to those skilled in the art. It is not desired therefore that the invention be limited to the specific arrangement as shown and described, and it is intended to cover any appended claims or such modifications as fall within the true spirit and scope of the invention.

I claim:

1. A control system for a tool having a motor and being connected to low and high pressure fluid sources to drive said motor, comprising normally closed pilot operated flow control valve means connected to said motor for sequentially passing low pressure fluid and high pressure fluid to drive said motor, a control valve connected to the low pressure source and to the valve means being operable to pilot actuate the valve means by the low pressure fluid, and delay means associated with the control valve and being responsive to the low pressure fluid for closing the pilot operated flow control means to limit the flow of high pressure fluid to said motor.

2. A control system for a tool connected to low and high pressure fluid sources and having a motor for sequentially providing a low force output in response to the low pressure fluid and a high force output in response to the high pressure fluid, comprising a pair of normally closed pilot actuated flow control valves connected to said motor, each valve controlling the flow of one of the pressure fluids, and a control valve connected to the pair of pilot operated flow control valves and to the low pressure fluid source for actuating the flow control valves, the control valve having a first operating position for passing low pressure fluid for opening one of the flow control valves to provide low pressure fluid to said motor and having a second operating position for opening the other flow control valve to provide high pressure fluid to said motor.

3. The control system according to claim 2, and time delay means connecting the control valve to the high pressure fluid flow control valve and being responsive to low pressure fluid from the control valve for closing the flow control valve after a predetermined time delay.

4. The control system according to claim 3, in which the time delay means is comprised of a flow reversing valve for connecting the control valve to the high pressure fluid flow control valve and having a restricted input connected to the control valve for metering low pressure fluid therefrom, the flow reversing valve being responsive to the metered pressure fluid after a delay determined by the restriction for blocking flow from the control valve to the high pressure fluid flow control valve and connecting the high pressure fluid flow control valve to vent for blocking the high pressure fluid.

5. A control system for torquing devices having a motor to provide low torque output for run-down operation in response to low pressure fluid and high torque output for final torquing in response to high pressure fluid, comprising a first normally closed pilot operated flow control valve connected to said motor and being adapted to receive low pressure fluid for driving said motor, a second normally closed pilot operated flow control valve connected to said motor and being adapted to receive high pressure fluid for driving said motor, and a flow reversing valve having a vent, being connected to the flow control valves, and being adapted to receive low pressure fluid for pilot operating the first flow control valve to pass low pressure fluid to said motor and for venting the second flow control valve when actuated and for reversing the flow connections in a second position for venting the first flow control valve to block low pressure fluid for pilot operating the second flow control valve to pass high pressure fluid to said motor.

6. The control system according to claim 5, and a time delay device connecting the flow reversing valve to the second flow control valve and being responsive to low pressure fluid from the flow reversing valve for closing the second flow reversing valve to block high pressure fluid after a predetermined time delay.

7. The control system according to claim 6, in which the time delay device is a piloted valve connecting the flow reversing valve to the second flow control valve to provide a flow path for low pressure fluid for opening the second flow control valve, the piloted valve having a vent and a restricted input connected to the flow reversing valve for metering low pressure fluid therefrom and being responsive to the metered fluid to block the flow path and to connect the second flow control valve to vent to block the high pressure fluid after a predetermined delay.

8. The control system according to claim 7, in which the restricted input is adjustable for varying the delay.

References Cited in the file of this patent

UNITED STATES PATENTS

| | | |
|---|---|---|
| 730,273 | Lane et al. | June 9, 1903 |
| 1,103,035 | Clark | July 14, 1914 |
| 1,103,036 | Clark | July 14, 1914 |
| 1,103,037 | Clark | July 14, 1914 |
| 2,356,366 | Wisl | Aug. 22, 1944 |
| 2,538,383 | Sandwell | Jan. 16, 1951 |
| 2,619,073 | Brooks et al. | Nov. 25, 1952 |
| 2,682,749 | Pinsenschaum | July 6, 1954 |